US011442450B2

(12) United States Patent
Yao et al.

(10) Patent No.: US 11,442,450 B2
(45) Date of Patent: Sep. 13, 2022

(54) METHOD FOR DETERMINING PASSABLE AREA IN PLANNING A PATH OF AUTONOMOUS DRIVING VEHICLES

(71) Applicants: Baidu USA LLC, Sunnyvale, CA (US); Baidu.com Times Technology (Beijing) Co., Ltd., Beijing (CN)

(72) Inventors: Dongchun Yao, Sunnyvale, CA (US); Fan Zhu, Sunnyvale, CA (US); Leibing Lv, Sunnyvale, CA (US); Xin Xu, Sunnyvale, CA (US); Ning Yu, Sunnyvale, CA (US)

(73) Assignees: BAIDU USA LLC, Sunnyvale, CA (US); BAIDU.COM TIMES TECHNOLOGY (BEIJING) CO., LTD., Beijing (CN)

(*) Notice: Subject to any disclaimer, the term of this patent is extended or adjusted under 35 U.S.C. 154(b) by 343 days.

(21) Appl. No.: 16/711,118

(22) Filed: Dec. 11, 2019

(65) Prior Publication Data
US 2021/0181741 A1 Jun. 17, 2021

(51) Int. Cl.
G05D 1/00 (2006.01)
G01C 21/34 (2006.01)
G05D 1/02 (2020.01)

(52) U.S. Cl.
CPC ....... G05D 1/0088 (2013.01); G01C 21/3492 (2013.01); G05D 1/0214 (2013.01); G05D 2201/0212 (2013.01)

(58) Field of Classification Search
CPC .............. G05D 1/0088; G05D 1/0214; G05D 2201/0212; G01C 21/3492
See application file for complete search history.

(56) References Cited

U.S. PATENT DOCUMENTS

2020/0398894 A1* 12/2020 Hudecek .............. G05D 1/0088

* cited by examiner

Primary Examiner — Michael D Lang
(74) Attorney, Agent, or Firm — Womble Bond Dickinson (US) LLP

(57) ABSTRACT

According to one embodiment, in response to determining that an obstacle blocks at least a portion of a current lane in which an ADV is driving, an obstacle boundary of the obstacle is determined based on the size and shape of the obstacle. A lane configuration is determined based on map data of a map corresponding to a road associated with the lanes. A passing lane boundary that can be utilized by the ADV is determined based on the lane configuration of the road and the obstacle boundary of the obstacle. A passable area is calculated within the passing lane boundary based on a size of the ADV. The passable area is utilized by the ADV to pass the obstacle without collision. Thereafter, a trajectory is planned within the passable area boundary to control the ADV to pass the obstacle.

20 Claims, 12 Drawing Sheets $$C_s(f) = w_0 \int f(s)^2 \, ds + w_1 \int (f'(s))^2 \, ds + w_2 \int (f''(s))^2 \, ds$$
$$+ w_3 \int f'''(s)^2 \, ds + w_4 \int (f(s) - g(s))^2 \, ds$$

600

$w_0 \int f(s)^2 \, ds$ — Cost representing a difference between trajectory to be planned and a reference line 601

$w_1 \int (f'(s))^2 \, ds + w_2 \int (f''(s))^2 \, ds + w_3 \int f'''(s)^2 \, ds$ — Cost representing curvature and smoothness of the trajectory to be planned 602

$w_4 \int (f(s) - g(s))^2 \, ds$ — Cost representing a difference between the trajectory to be planned and the obstacle avoidance preference line 603

FIG. 6

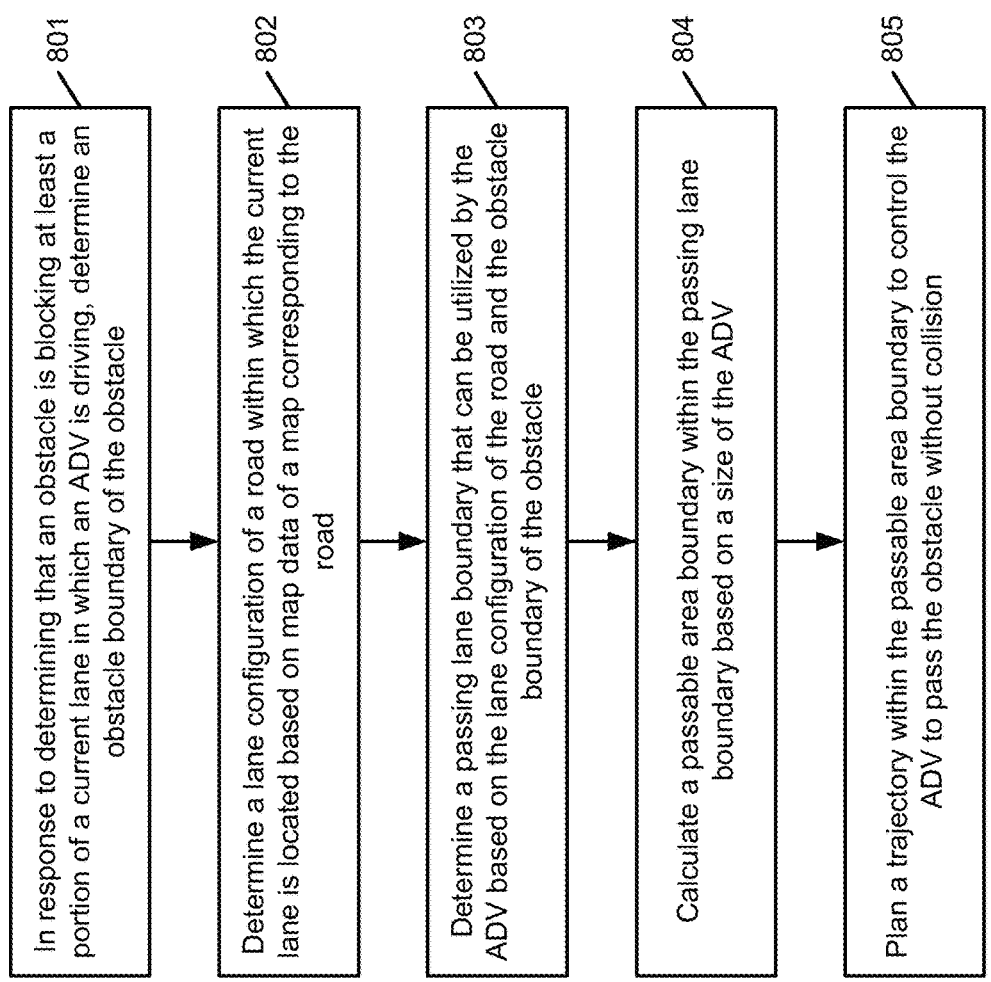

METHOD FOR DETERMINING PASSABLE AREA IN PLANNING A PATH OF AUTONOMOUS DRIVING VEHICLES

TECHNICAL FIELD

Embodiments of the present disclosure relate generally to operating autonomous vehicles. More particularly, embodiments of the disclosure relate to determining passable area of autonomous driving vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. Safety distance is essential in motion planning for autonomous driving vehicles (ADVs). However, planning approach based on discrete sample points usually causes that the frontend of the vehicle is too close to the obstacles.

BRIEF DESCRIPTION OF THE DRAWINGS

Embodiments of the disclosure are illustrated by way of example and not limitation in the figures of the accompanying drawings in which like references indicate similar elements.

FIG. 6 shows an example of an optimization formula to optimize a trajectory to pass within a passable area to pass an obstacle according to one embodiment.

FIG. 8 is a flow diagram illustrating a process of determining a passable area according to one embodiment.

DETAILED DESCRIPTION

Figure 1:
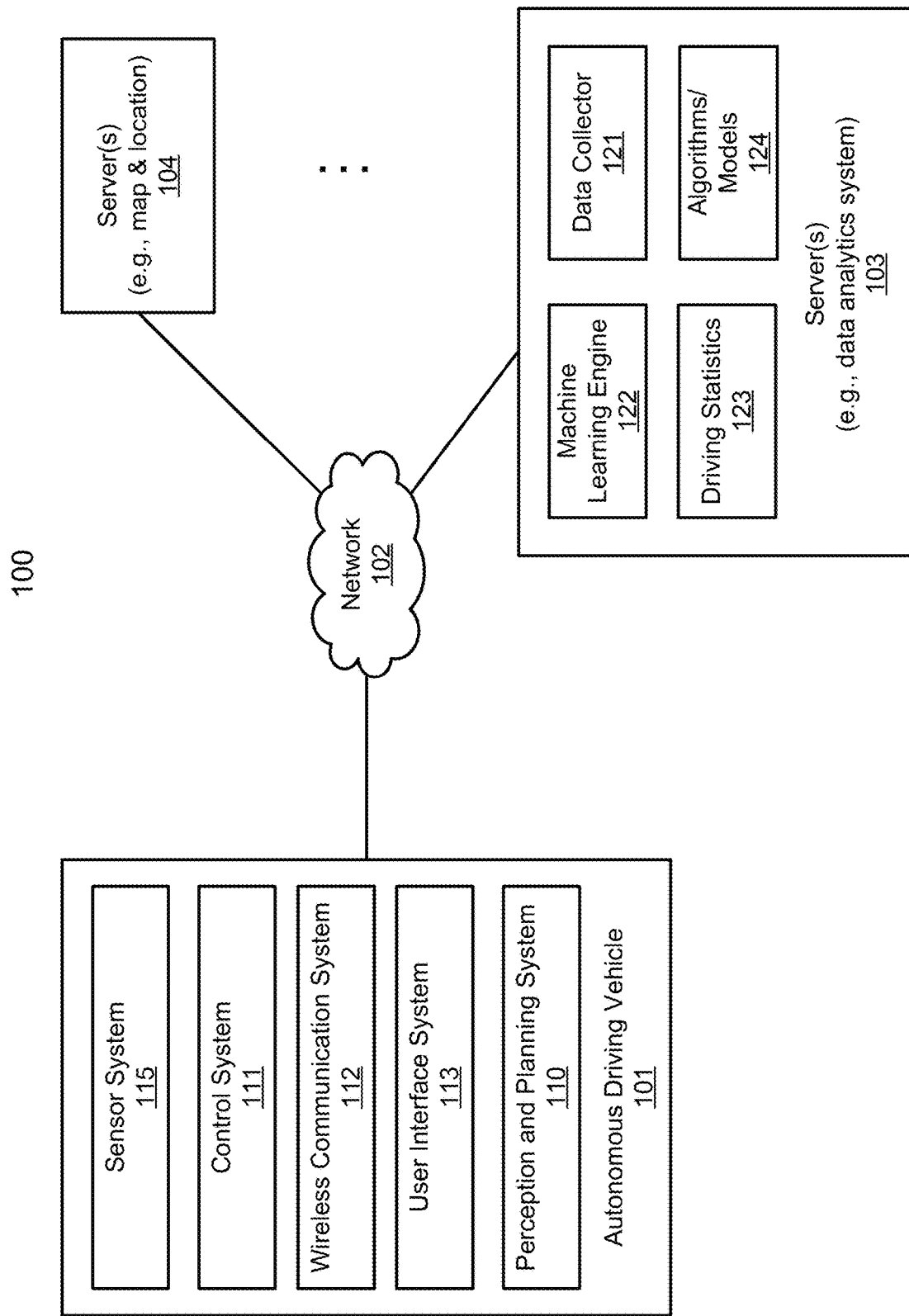
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, when detecting there is an obstacle blocking at least a portion of the lane in which an autonomous driving vehicle (ADV) is driving, the ADV determines the lane configuration of the road including adjacent lanes and their lane boundaries and types of the lanes. For the purpose of passing the obstacle, if the ADV is allowed to use an adjacent lane to pass the obstacle, the passable lane can be expanded to the adjacent lane. In addition, the obstacle boundary of the obstacle is also determined. The relative location relationships between the obstacle and the ADV to determine which side (e.g., left or right) of the obstacle the ADV should pass. Once the passable lane has been determined, passable area of the passing lane is determined based on the size and shape of the obstacle. The passable area may be determined further based on a predicted moving trajectory of the obstacle if the obstacle is a dynamic or moving obstacle. The boundary of the passable area may be utilized to generate a set of constraints such as lateral constraints. Thereafter, an optimization such as quadratic programing (QP) optimization is performed to generate a trajectory for passing the obstacle. When the lane includes a relatively sharp turn, the passing trajectory may be adjusted in view of the size and shape of the ADV, such that the ADV would not exceed the lane curb as part of safety purposes.

According to one embodiment, in response to determining that an obstacle blocks at least a portion of a current lane in which an ADV is driving, an obstacle boundary of the obstacle is determined based on the size and shape of the obstacle. A lane configuration is determined based on map data of a map corresponding to a road associated with the lanes. A passing lane boundary that can be utilized by the ADV is determined based on the lane configuration of the road and the obstacle boundary of the obstacle. A passable area is calculated within the passing lane boundary based on a size of the ADV. The passable area is utilized by the ADV to pass the obstacle without collision. Thereafter, a trajectory is planned within the passable area boundary to control the ADV to pass the obstacle.

In one embodiment, the size and shape of the obstacle is utilized to generate an obstacle boundary if the it is determined that the obstacle is a static obstacle (e.g., parked vehicle, trash can, etc.). However, when the obstacle is a dynamic or moving obstacle, a moving trajectory of the obstacle predicted by the ADV may be utilized to determine the passing lane boundary and/or passable area. In determining the passing lane, the boundary of the current lane may be adjusted or narrowed based on at least a portion of the obstacle boundary that is within the current lane boundary. The passable area within the passing lane may be determined by narrowing the passing lane based on a vehicle width of the ADV. In one embodiment, the lane width of the passing lane may be narrowed by at least a half of the vehicle width of the ADV.

In one embodiment, in determining a lane boundary that can be utilized by the ADV, it is determined whether the lane type of the current lane allows the ADV to enter an adjacent lane in order to pass the obstacle based on a set of traffic rules. If so, the passing lane boundary is expanded from a current lane boundary of the current lane to the adjacent lane. In one embodiment, if the lane line of the current lane is in a dash line, the ADV is allowed to enter an adjacent lane in order to pass an obstacle, based on a set of traffic rules. In one embodiment, when a passing lane is curve or is to turn sharply, the path may be adjusted such that the ADV may turn earlier in view of the size and shape of the ADV, such that the corners of the ADV does not exceed beyond the lane curb.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
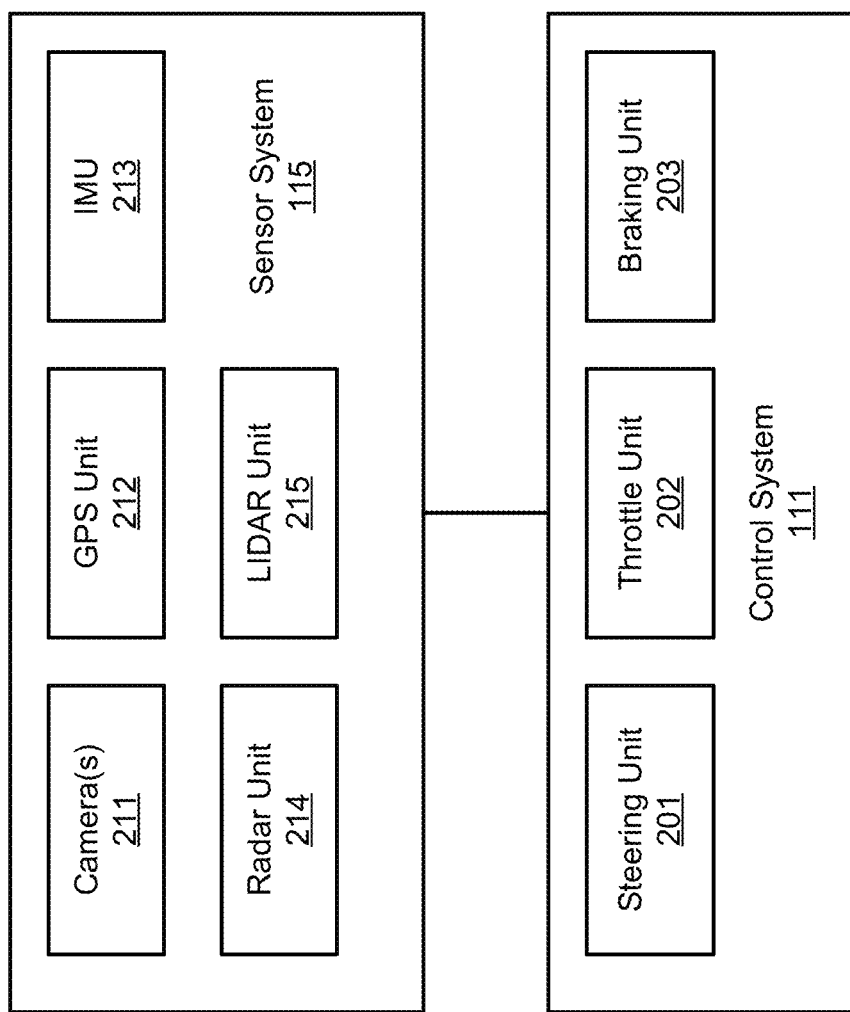
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include algorithms to determining a passing lane and a passable area to pass an obstacle without collision. Algorithms 124 can then be uploaded on ADVs to be utilized during autonomous driving in real-time.

Figure 3A:
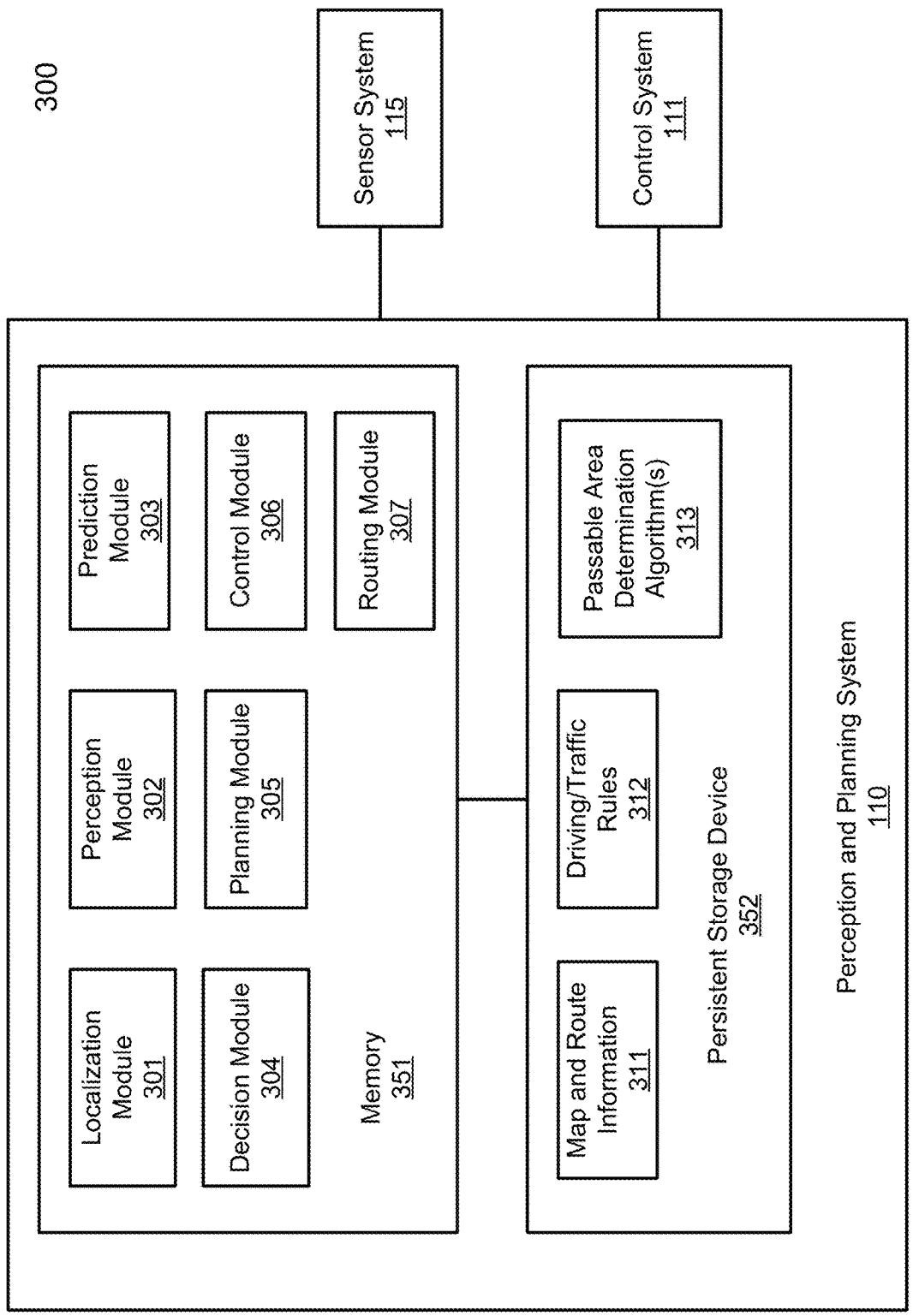
FIGS. 3A-3B are block diagrams illustrating an example of a perception and planning system used with an autonomous vehicle according to one embodiment.
Figure 3B:
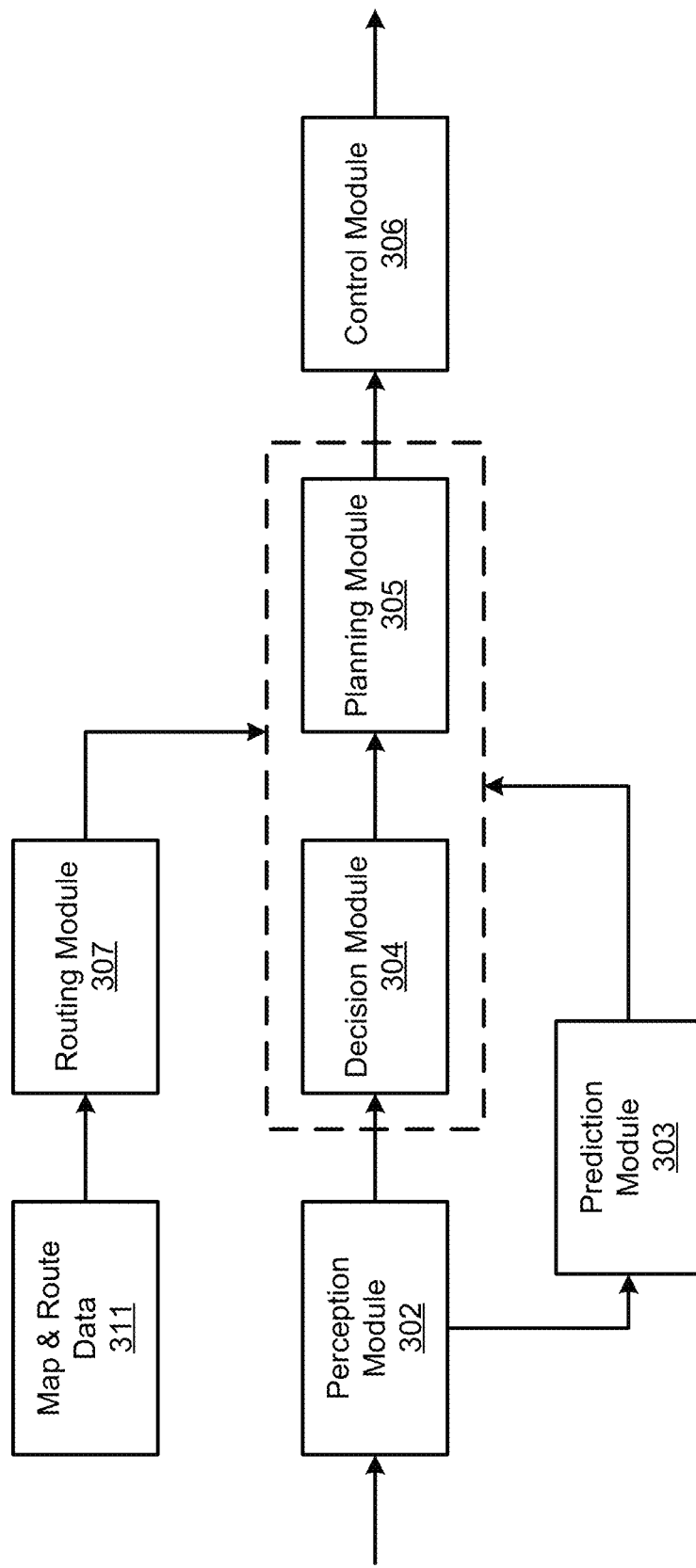

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Figure 4:
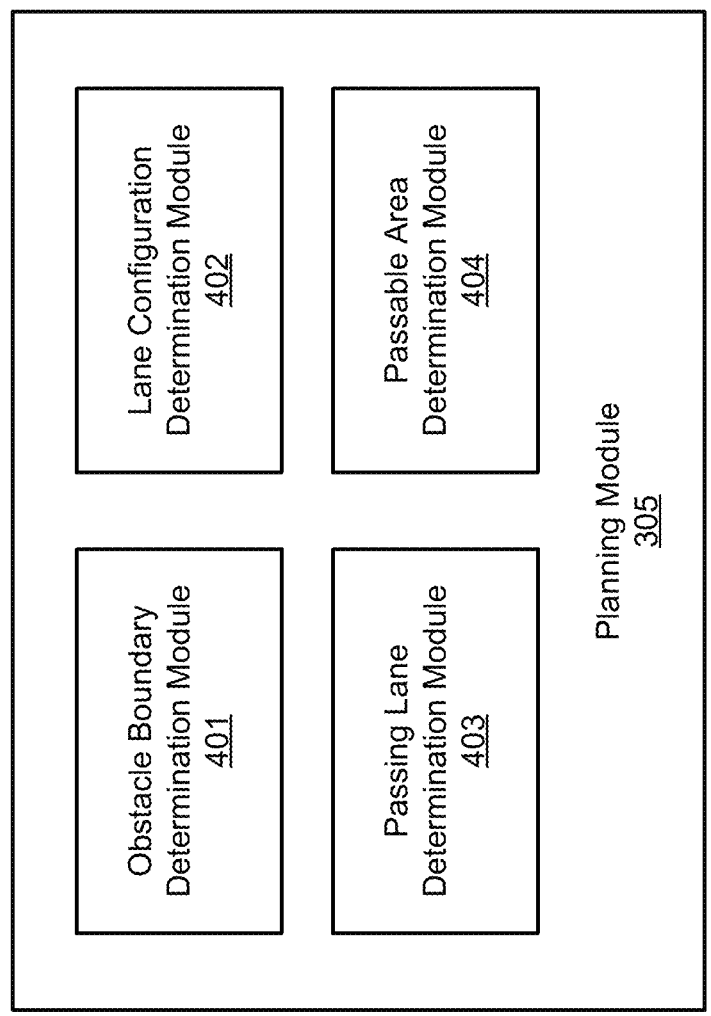
FIG. 4 is a block diagram illustrating an example of a planning module according to one embodiment.

FIG. 4 is a block diagram illustrating an example of a planning module according to one embodiment. Referring to FIG. 5, planning module 305 includes, amongst others, obstacle boundary determination module 401, lane configuration determination module 402, pass lane determination module 403, and passable area determination module 404. In one embodiment, obstacle boundary determination module 401 is configured to determine an obstacle boundary of an obstacle detected that blocks at least a portion of a current lane in which an ADV is driving. Lane configuration determination module 402 is configured to determine lane configuration of a road in which the ADV is located based on map data of a map corresponding to the road, including a number of lanes and the types of the lanes, etc. Pass lane determination module 403 is configured to determine a passing lane that can be utilized by the ADV based on the lane configuration of the road and the obstacle boundary of the obstacle. Passable area determination module 404 is configured to determine a passable area boundary within the passing lane boundary based on a size and/or shape of the ADV. The passable area is utilized by the ADV to pass the obstacle without collision. Thereafter, a trajectory is planned within the passable area boundary to control the ADV to pass the obstacle.

Figure 5A:
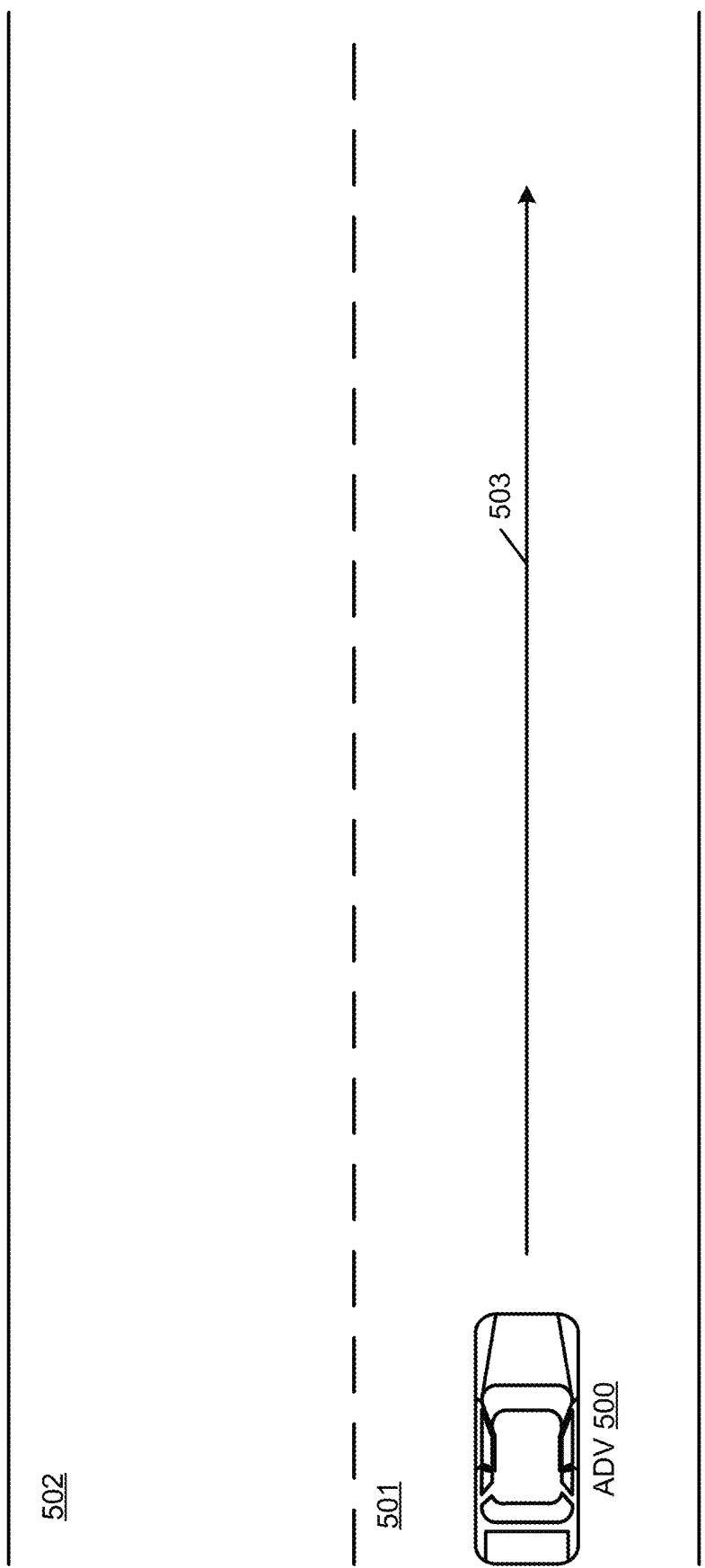
FIGS. 5A-5D show a process of determining a passable area for passing an obstacle according to one embodiment.
Figure 5B:
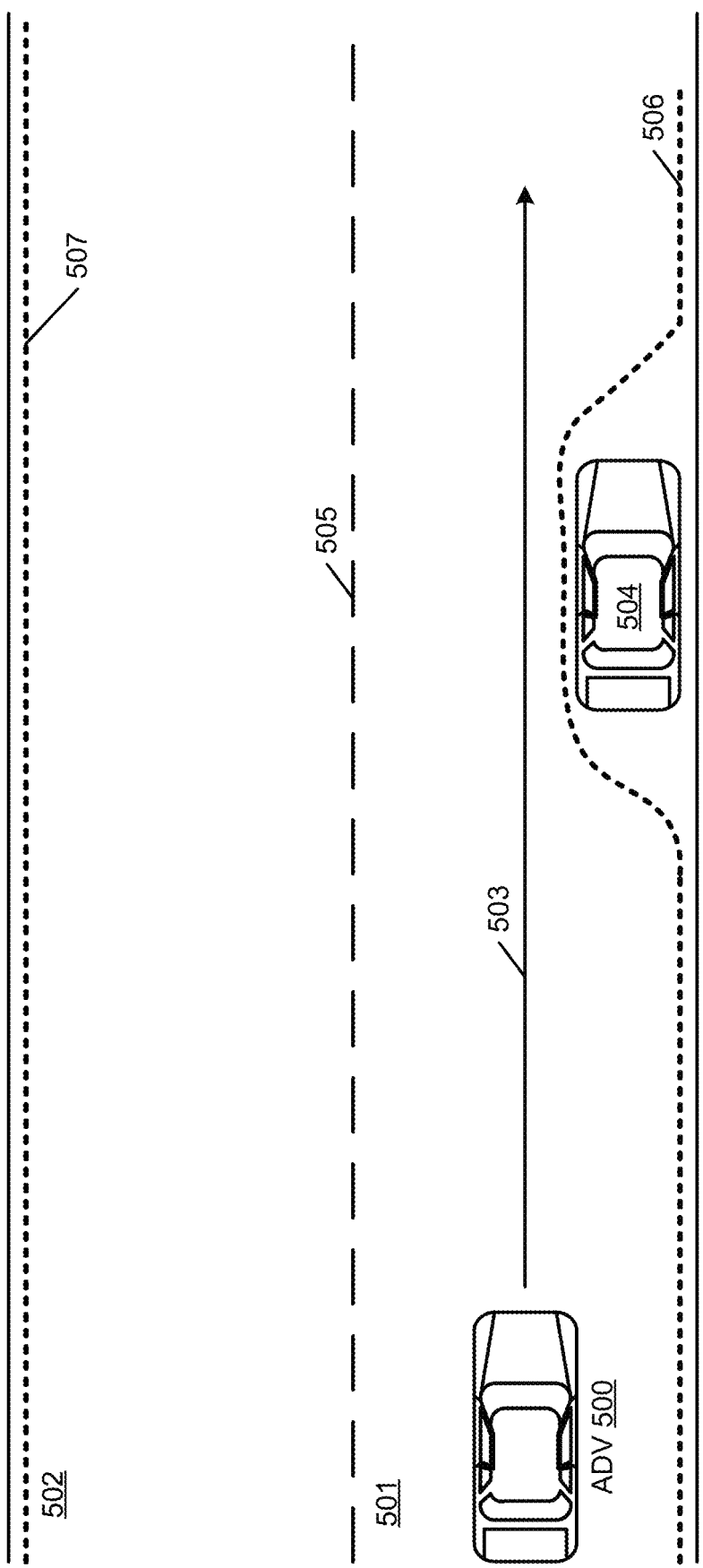

Referring now to FIG. 5A, for the purpose of illustration, in this example, ADV 500 is driving in lane 501 adjacent to lane 502. Assuming there is no obstacle nearby, the ADV is planned to drive along trajectory 503, typically a center line of lane 501. When there is an obstacle that blocks at least a portion of the lane as shown in FIG. 5B, if ADV 500 were to drive along trajectory 503, ADV 500 would collide with obstacle 504 (e.g., parked vehicle) due to the size and shape of ADV 500. In one embodiment, given driving circumstances, obstacle boundary determination module 401 determines the boundary of obstacle 504 (in this example, a parked vehicle). Lane configuration determination module 402 determines the current lane configuration of the road in which ADV 500 is driving.

For example, in addition to the current lane 501, an adjacent lane 502 is identified, which can be determined based on sensor data obtained from the sensors and/or map data obtained from the map associated with the road. Further, the type of lane 501 is also determined. In this example, the lane line 505 between lane 501 and lane 502 is a dash lane line, which indicates that a vehicle in any of the lanes 501 and 502 can enter or cross lane line 505 according to a set of traffic rules. That is, since lane line 505 is a dash or broken lane line, ADV 500 can enter lane 502 in order to pass obstacle 504. In this example, obstacle 504 is a static obstacle, i.e., non-moving obstacle.

In one embodiment, passing lane determination module 403 is configured to determine a pass lane to pass the obstacle. Dependent upon a number of obstacles nearby, a passing lane may include any possible area that ADV 500 is entitled to utilized legally. In this example, since lane line 505 allows ADV 501 to cross and enter lane 502, the passing lane can include lane 502 if there is no obstacle nearby. The passing lane is defined by the dotted lines 506 and 507. However, due to the size and shape of ADV 500, in order not to collide with obstacle 504 and the lane curbs, the passing lane defined by lines 506 and 507 may not be entirely available for ADV 500.

Figure 5C:
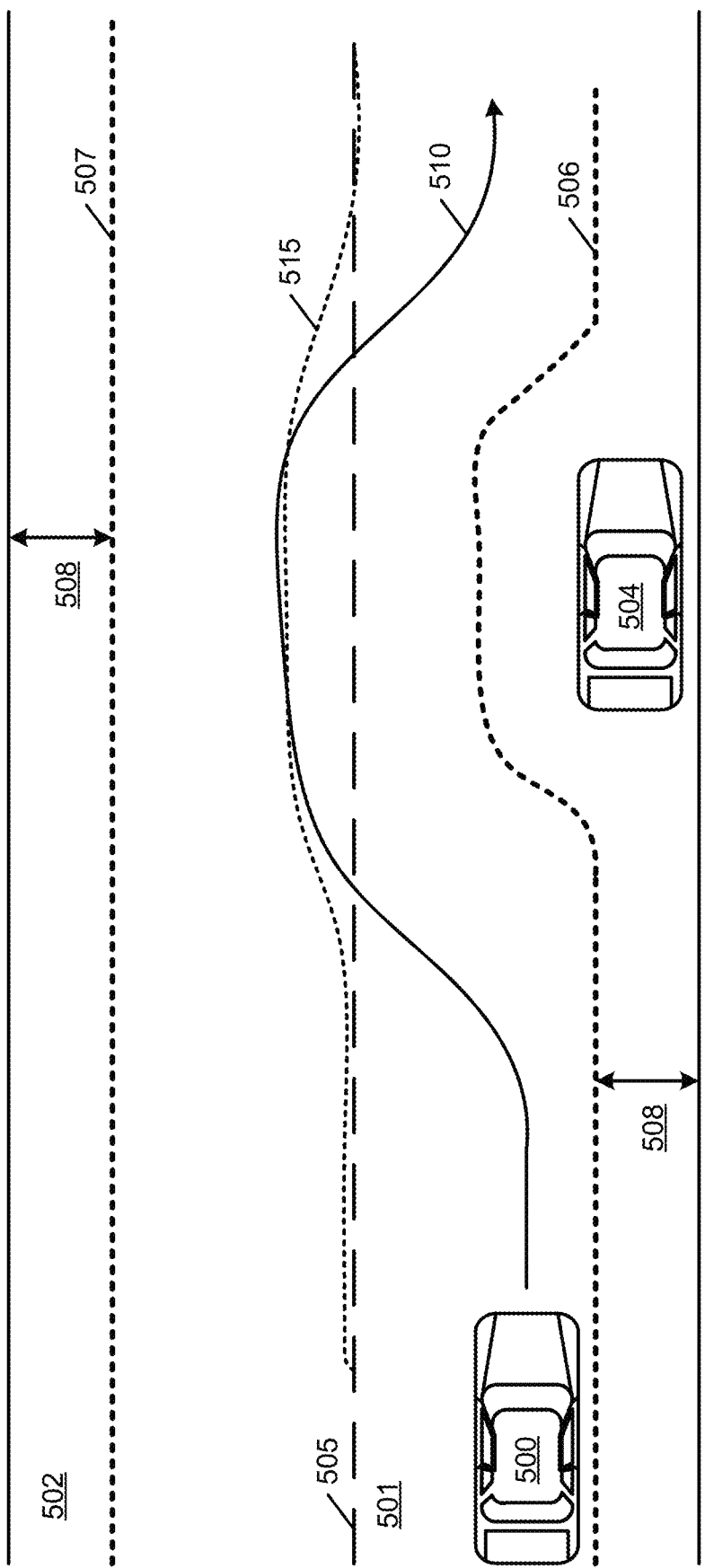

In one embodiment, passable area determination module 504 is configured to determine a passable area that can be utilized by ADV 500 to pass obstacle 504 as shown in FIG. 5C. Referring to FIG. 5C, in order to avoid collision with obstacle 504, passing lane line 506 is adjusted by introducing a buffering area. In this example, passing lane line 506 is moved inwardly based on a vehicle width of ADV 500. In one embodiment, lane line 506 is moved inwardly by distance 508 equivalent to at least a half of vehicle width of ADV 500. Similarly, passing lane line 507 is moved inwardly by at least a half of the vehicle width of ADV 500. The adjusted lines 506 and 507 define a passable area to allow ADV 500 to pass obstacle 504 without collision. Line 515 represents an obstacle avoidance preference line of the passing lane or passable area, which is typically the center line after boundary line 506 has been modified.

Thereafter, a path planning operation is performed to plan a path to pass obstacle 504. During the path planning, an optimization is performed such as quadratic programming (QP) optimization. In this example, path 510 is generated for ADV 500 to pass obstacle 504, typically representing a center line between lines 506-507.

In the example as described above, obstacle 504 is a static obstacle as a parked vehicle. The passing lane line 506 is defined based on the size and shape of obstacle 504 as shown in FIG. 5C. However, then obstacle 504 is a dynamic or moving obstacle, the lane boundary and/or passable area may be different dependent upon how the obstacle 504 will move. In one embodiment, if an obstacle is a dynamic obstacle, its predicted moving trajectory may be taken into consideration when determining a passing lane boundary and/or passable area.

Figure 5D:
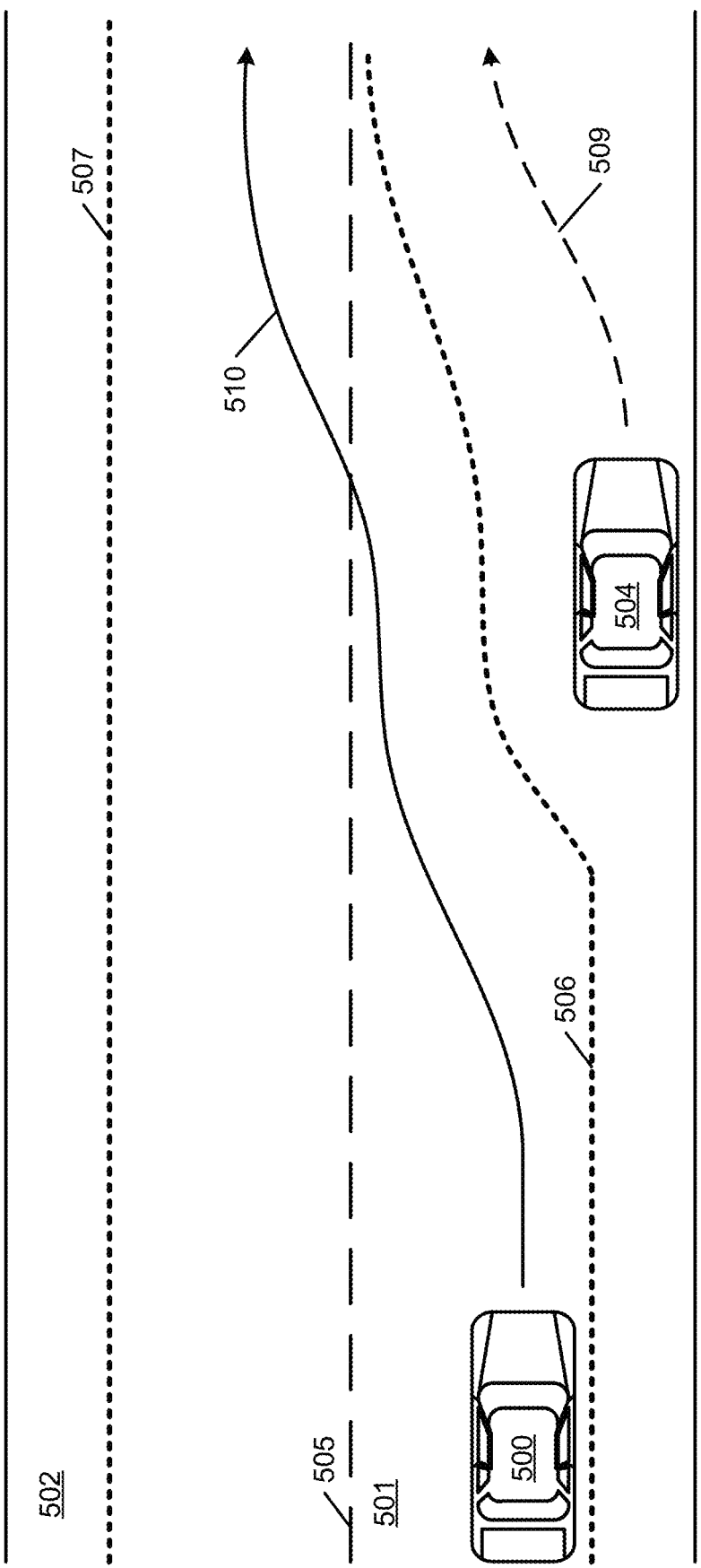

Referring now to FIG. 5D, in this example, it is assumed obstacle 504 is a dynamic obstacle and its moving trajectory 509 has been predicted, for example, by prediction module 303. Based on the predicted moving trajectory 509, the boundary 506 of passable area may be adjusted accordingly. Thereafter, a moving trajectory for ADV 500 is planned, for example, using QP optimization. When planning a moving trajectory for ADV 500, the boundaries 506-507 defining the passable area are utilized as a set of constraints such as lateral constraints such that moving trajectory 510 does not exceed the boundaries 506-507.

FIG. 6 shows an example of an objective function for QP optimization according to one embodiment. In this example, the objective function is a $5^{th}$ order polynomial function. Function f(s) represents a trajectory to be planned for driving the ADV. Function g(s) represents an obstacle avoidance preference line such as obstacle avoidance line 515. Coefficients w0-w4 are the weight factors for each element. The goal is to optimize the objective function 600 to determine f(s), such that the output (e.g., total cost) of the objective function 600 reaches minimum.

Referring to FIG. 6, objective function 600 is formed by several cost elements, including costs 601-603. Cost 601 represents a difference between the planned trajectory and the reference line generated based on the passable area at different points in time. Larger difference is associated with a higher cost. Cost 602 represents the curvature and smoothness of the planned trajectory. Smoother leads to a lower cost. Cost 603 represents a difference between the planned trajectory and the obstacle avoidance line. The larger difference leads to a higher cost. The QP optimization is performed on the objective function 600 to determine f(s), i.e., the trajectory being planned, such that the total cost reaches minimum.

QP programming is a process of solving a special type of mathematical optimization problem, specifically, a (linearly constrained) quadratic optimization problem, that is, the problem of optimizing (minimizing or maximizing) a quadratic function of several variables subject to linear constraints on these variables. Quadratic programming is a particular type of nonlinear programming. In one embodiment, the QP optimization is performed based on the polynomial optimization of a cost function, such that the total cost of the cost function (also referred to as an objective function) reach minimum, while each point of the polynomial curve satisfies the set of constraints, i.e., the boundaries of the passable area as defined by lines 506-507.

The term of polynomial optimization or polynomial fit refers to the optimization of the shape of a curve (in this example, a trajectory) represented by a polynomial function (e.g., quintic or quartic polynomial functions), such that the curve is continuous along the curve a derivative at the joint of two adjacent segments is obtainable). In the field of autonomous driving, the polynomial curve from a starting point to an end point is divided into a number of segments (or pieces), each segment corresponding to a control point (or reference point). Such a segmented polynomial curve is referred to as a piecewise polynomial. When optimizing the piecewise polynomial, a set of joint constraints and a set of boundary constraints between two adjacent segments have to be satisfied, in addition to the set of initial state constraints and end state constraints.

The set of joint constraints includes positions (x, y), speed, heading direction, and acceleration of the adjacent segments have to be identical. For example, the ending position of a first segment (e.g., leading segment) and the starting position of a second segment (e.g., following segment) have to be identical or within a predetermined proximity. The speed, heading direction, and acceleration of the ending position of the first segment and the corresponding speed, heading direction, and acceleration of the starting position of the second segment have to be identical or within a predetermined range. In addition, each control point is associated with a predefined boundary (e.g., 0.2 meters left and right surrounding the control point). The polynomial curve has to go through each control point within its corresponding boundary. When these two set of constraints are satisfied during the optimization, the polynomial curve representing a trajectory should be smooth and continuous.

A driving environment could be vastly different at different points in time and different locations. When a lane is not a straight lane, the planning of the path to drive an ADV could be challenging. The trajectory planning needs to ensure that any part of the ADV does not go beyond the boundary of passable area. For example, when the lane includes a relatively sharp turn, due to the physical dimension of the ADV, when the ADV turns, its body may exceed the lane boundary, which may collide with an obstacle outside of the lane boundary, such as a pedestrian on the wide walk. Accordingly, when planning a trajectory for an ADV, the physical size and shape of the ADV need to be taken into consideration when the lane is curved.

Figure 7B:
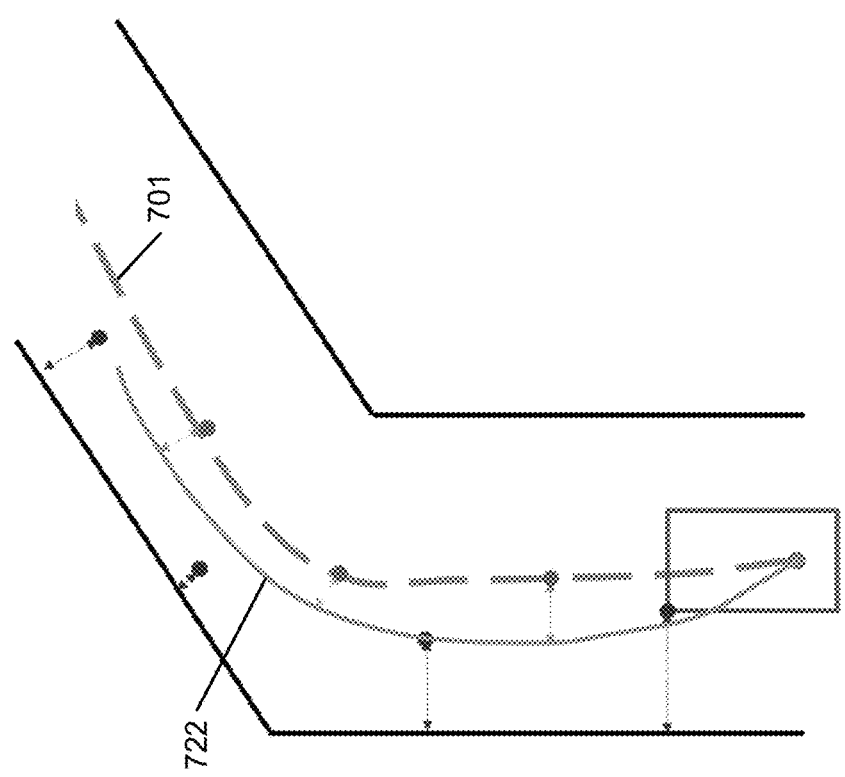
FIGS. 7A and 7B show a process of determining a passable area for passing an obstacle according to another embodiment.
Figure 7A:
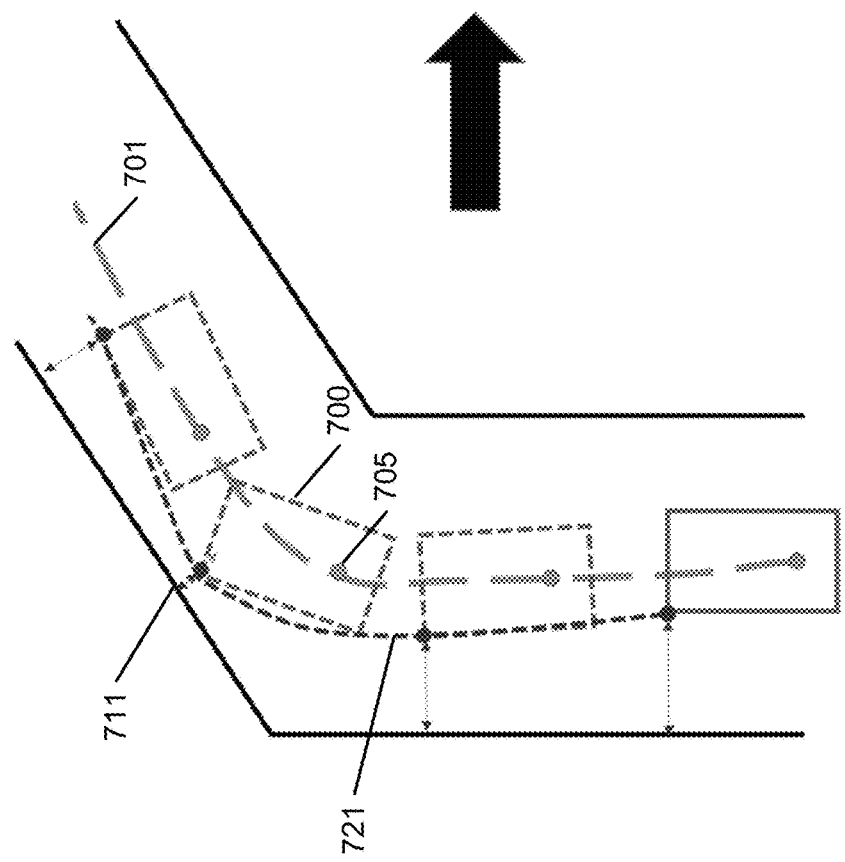

Referring now to FIG. 7A, in this example, the lane has a sharp turn and the ADV 700 drives along reference line 701. Typically, when planning a trajectory for ADV 500, the location of the ADV 500 is based on the center of the rear axle. Thus, as shown in FIG. 7A, when reference line 701 is generated, it is assumed the center of the rear axle 705 of ADV 500 moves along the reference line 701. However, although the center of rear axle 705 is planned within the passable area and along reference line 701 (e.g., obstacle avoidance preference line after the adjusting the original reference line), due to the size and shape of ADV 500, other parts of the vehicle may exceed the passable area during the sharp turn.

For example, when ADV 700 approaches the sharp turn area, the left front corner may be too close to or exceeding the left lane curb at point 711. The left edge line 721 represents the left most area that ADV 700 occupies. According to one embodiment, during each driving cycle (e.g., 100 ms), a first distance is determined between the front corner, in this example, the left front corner 711, and the lane curb (e.g., the left lane curb). A second distance is determined between the center of rear axle 705 and the lane curb. The first distance plus the half of vehicle width of ADV 500 is then compared with the second distance. Whichever shorter distance between the first distance and the second distance is utilized as a part of constraints for the center of rear axle 705 for the purpose of optimizing the trajectory to drive the ADV 700. The result of such an adjustment is shown in FIG. 7B, where the left edge line 722 represents the left most area that ADV 700 will occupy.

FIG. 8 is a flow diagram illustrating an example of a process of operating an autonomous driving vehicle according to one embodiment. Process 800 may be performed by processing logic which may include software, hardware, or a combination thereof. For example, process 800 may be performed by planning module 305. Referring to FIG. 8, at block 801, in response to determining that an obstacle blocks at least a portion of a current lane in which an ADV is driving, processing logic determines an obstacle boundary of the obstacle. The obstacle may be detected by perception module 302 and/or prediction module 303. At block 802, processing logic determines a lane configuration of a road within which the current lane is located based on map data of a map associated with the road. At block 803, processing logic determines a passing lane boundary that can be utilized by the ADV based on the lane configuration of the road and obstacle boundary of the obstacle. At block 804, processing logic determines a passable area boundary within the passing lane boundary based on a size of the ADV. At block 805, processing logic determines a trajectory within the passable area boundary to control the ADV to pass the obstacle without collision.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of operating an autonomous driving vehicle (ADV), the computer-implemented method comprising:
   in response to determining that an obstacle is blocking at least a portion of a current lane in which an ADV is driving, determining an obstacle boundary of the obstacle;
   determining a lane configuration of a road within which the current lane is located based on map data of a map corresponding to the road, wherein the lane configuration comprises a number of lanes within the road and a lane type of each of the number of lanes;
   determining a passing lane boundary of a passing lane that can be utilized by the ADV based on the lane configuration of the road and the obstacle boundary of the obstacle;
   calculating a passable area boundary within the passing lane boundary based on a size of the ADV, wherein the passable area boundary is utilized by the ADV to pass the obstacle without collision; and
   planning a trajectory within the passable area boundary to control the ADV to pass the obstacle.

2. The computer-implemented method of claim 1, further comprising:
   determining whether the obstacle is a static obstacle; and
   in response to determining that the obstacle is a static obstacle, determining the obstacle boundary based on a size and a shape of the obstacle.

3. The computer-implemented method of claim 1, further comprising:
   determining whether the obstacle is a dynamic obstacle;
   in response to determining that the obstacle is a dynamic obstacle, predicting a moving trajectory of the obstacle; and
   determining the obstacle boundary based on the moving trajectory of the obstacle.

4. The computer-implemented method of claim 1, wherein determining the passing lane boundary comprises adjusting a current lane boundary of the current lane by subtracting at least a portion of the obstacle boundary that is within the current lane boundary.

5. The computer-implemented method of claim 4, wherein determining the passable area boundary within the passing lane boundary comprises reducing a passing lane width of the passing lane based on a vehicle width of the ADV.

6. The computer-implemented method of claim 5, wherein the passing lane width is reduced by a half of the vehicle width of the ADV.

7. The computer-implemented method of claim 5, wherein determining the lane boundary that can be utilized by the ADV comprises:
   determining whether the lane type of the current lane allows the ADV to enter an adjacent lane in order to pass the obstacle based on a set of traffic rules; and
   expanding the passing lane boundary from the current lane boundary of the current lane to the adjacent lane, in response to determining that the adjacent lane can be utilized by the ADV.

8. The computer-implemented method of claim 7, wherein determining the lane type of the current lane comprises whether a lane line of the current lane includes a dash line, wherein the ADV is allowed to enter the adjacent lane if the lane line includes a dash line.

9. The computer-implemented method of claim 1, further comprising:
   determining a lane curve of the passing lane; and
   adjusting the passing lane boundary based on the lane curve of the passing lane and a-a vehicle boundary of the ADV, such that the vehicle boundary of the ADV does not reach a road curb of the road when the ADV drives through the lane curve of the passing lane.

10. A non-transitory machine-readable medium having instructions stored therein, which when executed by a processor, cause the processor to perform operations of operating an autonomous driving vehicle (ADV), the operations comprising:
    in response to determining that an obstacle is blocking at least a portion of a current lane in which an ADV is driving, determining an obstacle boundary of the obstacle;
    determining a lane configuration of a road within which the current lane is located based on map data of a map corresponding to the road, wherein the lane configuration comprises a number of lanes within the road and a lane type of each of the number of lanes;
    determining a passing lane boundary of a passing lane that can be utilized by the ADV based on the lane configuration of the road and the obstacle boundary of the obstacle;
    calculating a passable area boundary within the passing lane boundary based on a size of the ADV, wherein the passable area boundary is utilized by the ADV to pass the obstacle without collision; and
    planning a trajectory within the passable area boundary to control the ADV to pass the obstacle.

11. The non-transitory machine-readable medium of claim 10, wherein the operations further comprise:
    determining whether the obstacle is a static obstacle; and
    in response to determining that the obstacle is a static obstacle, determining the obstacle boundary based on a size and a shape of the obstacle.

12. The non-transitory machine-readable medium of claim 10, wherein the operations further comprise:
    determining whether the obstacle is a dynamic obstacle;
    in response to determining that the obstacle is a dynamic obstacle, predicting a moving trajectory of the obstacle; and
    determining the obstacle boundary based on the moving trajectory of the obstacle.

13. The non-transitory machine-readable medium of claim 10, wherein determining the passing lane boundary comprises adjusting a current lane boundary of the current lane by subtracting at least a portion of the obstacle boundary that is within the current lane boundary.

14. The non-transitory machine-readable medium of claim 13, wherein determining the passable area boundary within the passing lane comprises reducing a passing lane width of the passing lane based on a vehicle width of the ADV.

15. The non-transitory machine-readable medium of claim 14, wherein the passing lane width is reduced by a half of the vehicle width of the ADV.

16. The non-transitory machine-readable medium of claim 14, wherein determining the lane boundary that can be utilized by the ADV comprises:
    determining whether the lane type of the current lane allows the ADV to enter an adjacent lane in order to pass the obstacle based on a set of traffic rules; and
    expanding the passing lane boundary from the current lane boundary of the current lane to the adjacent lane, in response to determining that the adjacent lane can be utilized by the ADV.

17. The non-transitory machine-readable medium of claim 16, wherein determining the lane type of the current lane comprises whether a lane line of the current lane includes a dash line, wherein the ADV is allowed to enter the adjacent lane if the lane line includes a dash line.

18. A data processing system, comprising:
    a processor; and
    a memory coupled to the processor to store instructions, which when executed by the processor, cause the processor to perform operations, the operations including:
        in response to determining that an obstacle is blocking at least a portion of a current lane in which an autonomous driving vehicle (ADV) is driving, determining an obstacle boundary of the obstacle,
        determining a lane configuration of a road within which the current lane is located based on map data of a map corresponding to the road, wherein the lane configuration comprises a number of lanes within the road and a lane type of each of the number of lanes,
        determining a passing lane boundary of a passing lane that can be utilized by the ADV based on the lane configuration of the road and the obstacle boundary of the obstacle,
        calculating a passable area boundary within the passing lane boundary based on a size of the ADV, wherein the passable area boundary is utilized by the ADV to pass the obstacle without collision, and
        planning a trajectory within the passable area boundary to control the ADV to pass the obstacle.

19. The data processing system of claim 18, wherein the operations further comprise:
    determining whether the obstacle is a static obstacle; and
    in response to determining that the obstacle is a static obstacle, determining the obstacle boundary based on a size and a shape of the obstacle.

20. The data processing system of claim 18, wherein the operations further comprise:
    determining whether the obstacle is a dynamic obstacle;
    in response to determining that the obstacle is a dynamic obstacle, predicting a moving trajectory of the obstacle; and
    determining the obstacle boundary based on the moving trajectory of the obstacle.

* * * * *